United States Patent
Lee et al.

(10) Patent No.: US 9,921,794 B2
(45) Date of Patent: Mar. 20, 2018

(54) BLIND DISPLAY DEVICE

(71) Applicant: SAMSUNG DISPLAY CO., LTD., Yongin-si, Gyeonggi-do (KR)

(72) Inventors: Jong-Chan Lee, Suwon-si (KR); So-Young Koo, Yongin-si (KR); Myoung-Geun Cha, Seoul (KR); Yoon-Ho Khang, Yongin-si (KR); Myoung-Hwa Kim, Seoul (KR); Woong-Hee Jeong, Seoul (KR)

(73) Assignee: Samsung Display Co., Ltd., Yongin-si, Gyeonggi-do (KR)

( * ) Notice: Subject to any disclaimer, the term of this patent is extended or adjusted under 35 U.S.C. 154(b) by 113 days.

(21) Appl. No.: 15/015,159

(22) Filed: Feb. 4, 2016

(65) Prior Publication Data

US 2017/0031642 A1     Feb. 2, 2017

(30) Foreign Application Priority Data

Jul. 29, 2015 (KR) ........................ 10-2015-0107109

(51) Int. Cl.
*G06F 3/14*     (2006.01)
*G09G 3/20*     (2006.01)

(52) U.S. Cl.
CPC ............. *G06F 3/1446* (2013.01); *G09G 3/20* (2013.01); *G09G 2300/026* (2013.01); *G09G 2310/0232* (2013.01); *G09G 2320/0233* (2013.01)

(58) Field of Classification Search
CPC combination set(s) only.
See application file for complete search history.

(56) References Cited

U.S. PATENT DOCUMENTS

| | | | |
|---|---|---|---|
| 2008/0303747 A1* | 12/2008 | Velicescu | G06Q 30/02 345/1.3 |
| 2010/0182218 A1* | 7/2010 | Daniel | G09F 9/33 345/1.3 |
| 2011/0126992 A1* | 6/2011 | Yordanova | E06B 9/386 160/127 |
| 2012/0274575 A1* | 11/2012 | Solomon | G06F 1/1601 345/173 |
| 2015/0024220 A1 | 1/2015 | Hwang | |

* cited by examiner

*Primary Examiner* — Robin Mishler
(74) *Attorney, Agent, or Firm* — Lee & Morse, P.C.

(57) ABSTRACT

A blind display device includes a plurality of curved display panels, a support, and a plurality of rotators. Each of the curved display panels includes a curved display area between a flat display area and a bezel area. The support guides movement of the curved display panels. The rotators couple corresponding ones of the curved display panels to the support and rotate corresponding ones of the curved display panels.

20 Claims, 8 Drawing Sheets

BLIND DISPLAY DEVICE

CROSS REFERENCE TO RELATED APPLICATION

Korean Patent Application No. 10-2015-0107109, filed on Jul. 29, 2015, and entitled, "Blind Display Device," is incorporated by reference herein in its entirety.

BACKGROUND

1. Field

One or more embodiments described herein relate to a blind display device.

2. Description of the Related Art

A multiple-display device displays a composite image using a plurality of display panels, e.g., each panel displays a portion of the image. One type of multiple-display device (referred to herein as a vertical blind display device) is used to implement a large size screen in a limited space.

Vertical blind and other types of multiple-display devices have bezel areas or borders that link the display panels. The bezel areas appear as black lines in the composite image and thus serve to diminish display quality. In addition, the display panels are controlled independently from one another. As a result, a luminance difference and/or color difference may exist between the display panels, thereby further diminishing display quality.

SUMMARY

In accordance with one or more embodiments, a blind display device includes a plurality of curved display panels arranged in a first direction, each of the curved display panels including a curved display area between a flat display area and a bezel area; a support to guide movement of the curved display panels; and a plurality of rotators to couple corresponding ones of the curved display panels to the support and to rotate corresponding ones of the curved display panels.

The bezel area in a first curved display panel may include a driver integrated circuit (IC) to control display of an image at the flat display area and the curved display area of the first curved display panel; and a first contact to be electrically connected to a second curved display panel adjacent to the first curved display panel. The flat display area in the second curved display panel may include a second contact in the flat display area, the second contact to be electrically connected to the first contact of the first curved display panel. The bezel area of the first curved display panel may contact a side of the flat display area of the second curved display panel, when the first curved display panel and the second curved display panel are to be physically connected.

The first contact may contact the second contact to allow an image control signal to be shared between the first curved display panel and the second curved display panel. The curved display panels may control luminance substantially equivalently based on the shared image control signal.

The first contact and the second contact may include Radio Frequency Identification (RFID) communication circuits, and the first curved display panel and the second curved display panel may communicate with one another through the RFID communication circuits in the first and second contacts. The first contact and the second contact may include optical communication components, and the first curved display panel and the second curved display panel may communicate with one another through the optical communication components of the first and second contacts.

The bezel area may extend to upper regions of the flat display area and the curved display area and to lower regions of the flat display area and the curved display area. The bezel area in the second curved display panel may include a second contact in at least one of an upper region of the bezel area, which is to extend to the upper regions of the flat display area and the curved display area, or a lower region of the bezel area which is to extend to the lower regions of the flat display area and the curved display area, and the second contact may be electrically connected to the first contact of the first curved display panel when the first curved display panel and the second curved display panel are to be physically connected. The support may expand or reduce in size according to movement of the curved display panels.

The driver IC may include a controller to generate an image control signal for synchronization of images displayed through the curved display panels; and a display panel driver to provide a data signal and a gate signal to the flat display area and the curved display area. The curved display area may display a backup image or a sub image at a border between adjacent ones of the curved display panels when the curved display panels are physically connected to each other.

Each of the curved display panels may include a buffer at inner surfaces of the flat display area, the curved display area, and the bezel area of each of the curved display panels, wherein the buffer attaches a corresponding one of the rotators to a respective one of the curved display panels. The rotator may penetrate the buffer and is connected to the support.

The blind display device may include a panel blind controller to control rotation of the rotators in order to electrically and mechanically connect the curved display panels to form an integrated display panel. The panel blind controller may control movement of the curved display panels when the curved display panels are aligned in a substantially parallel manner through rotation. The support may be expanded or reduced in size according to movement of the curved display panels.

In accordance with one or more other embodiments, a blind display device includes a plurality of curved display panels arranged in a first direction, each of the curved display panels including a curved display area between a flat display area and a bezel area; a support to guide movement of the curved display panels, the support to expand or reduce in size according to movement of the curved display panels; and a plurality of rotators to couple respective ones of the curved display panels and the support and to rotate respective ones of the curved display panels. Each of the curved display panels may include a contact to contact an adjacent curved display panel contacts, wherein the contact may transfer an image control signal to the adjacent curved display panel.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
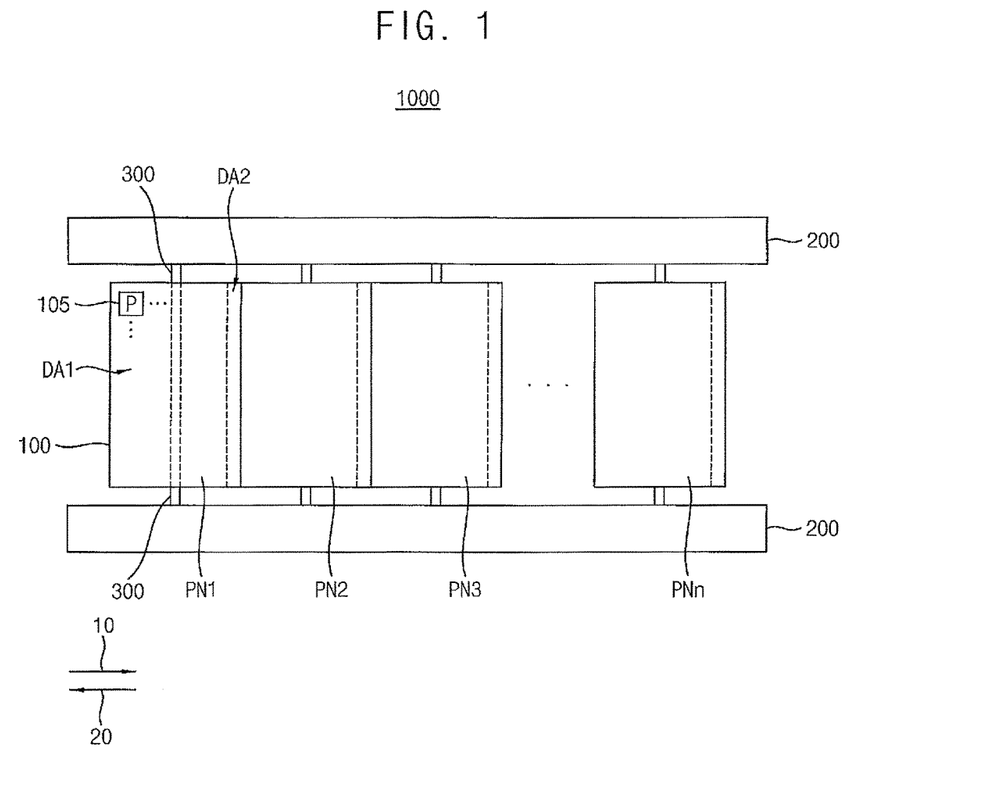
FIG. 1 illustrates an embodiment of a blind display device.
Figure 2A:
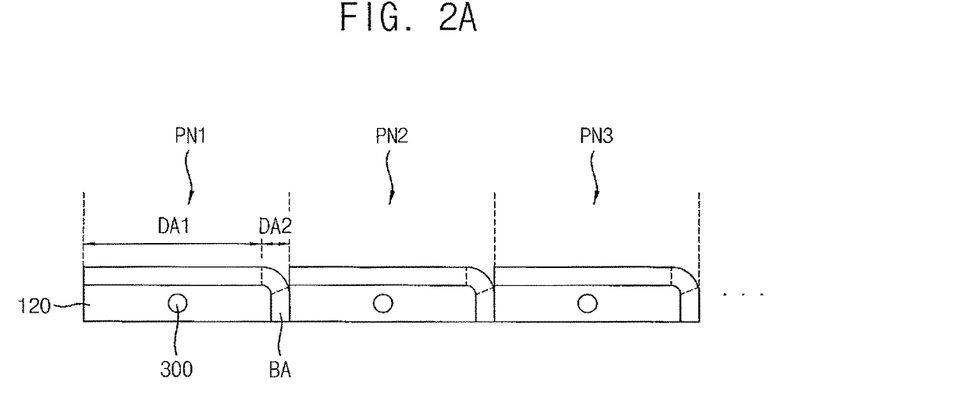
FIGS. 2A-2C illustrate example arrangements of curved display panels.
Figure 2B:
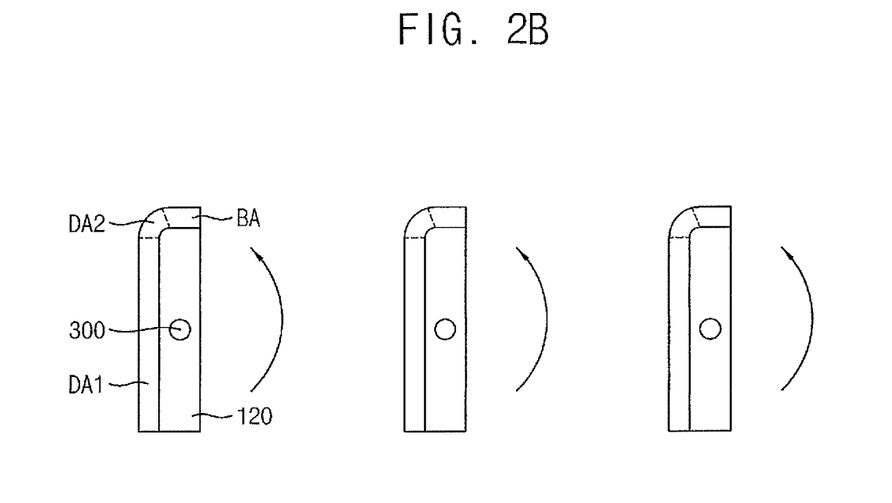
Figure 2C:
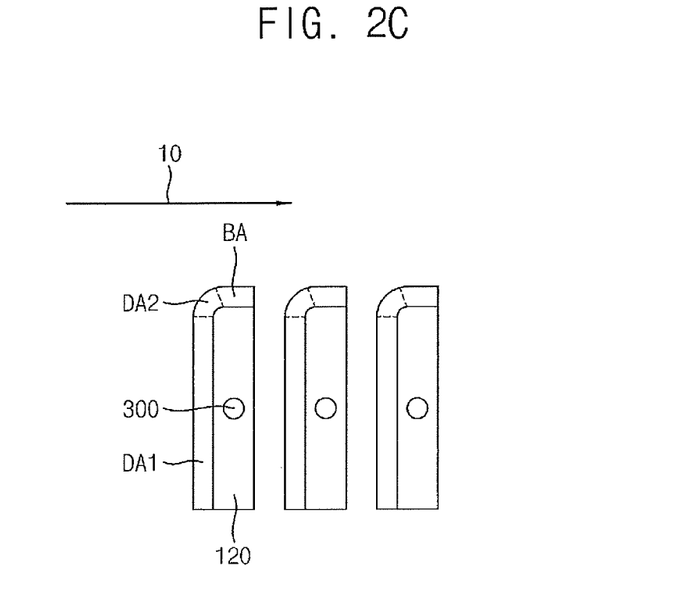

FIG. 1 illustrates an embodiment of a blind display device 1000, and FIGS. 2A to 2C illustrate example arrangements of a plurality of curved display panels (PN1 to PNn) 100 included in the blind display device of FIG. 1.

Referring to FIGS. 1 to 2C, the blind display device 1000 includes the curved display panels 100 (PN1 to PNn), a support member 200, and a rotating member 300. The curved display panels PN1 to PNn may be combined (or mechanically connected) to display a combined image. For example, the curved display panels PN1 to PNn may form an integrated display panel to display a large size image. In one embodiment, the curved display panels PN1 to PNn may be rotated into a substantially parallel alignment. When the curved display panels PN1 to PNn are rotated and thus separated, the curved display panels PN1 to PNn may or may not display images.

The curved display panels PN1 to PNn may be arranged in a first direction 10. Each curved display panel PN1 to PNn may include a flat display area DA1, a bezel area BA, and a curved display area DA2 between the flat display area DA1 and the bezel area BA. The first direction 10 may be a horizontal direction and a second direction 20 may be a direction opposite to the first direction 10.

The flat display area DA1 and the curved display area DA2 may include a plurality of pixels 105. In one embodiment, each pixel 105 includes an organic light emitting diode (OLED). The curved display panel 100 may consist of pixels circuits and the OLED disposed on a flexible substrate. Thus, a display area of the curved display panel 100 may be divided by the flat display area DA1 displaying a main image and the curved display area DA2 displaying a sub image or a backup image. The curved display panels PN1 to PNn may be rotated and physically connected to each other to form an integrated display panel for displaying a single composite image. The backup image (or the sub image) may represent a continuation of the image displayed in the flat display areas DA1. For example, the curved display area DA2 of a first curved display panel PN1 may display the backup image in order to visually link an image of the first curved display panel PN1 and an image of the second curved display panel PN2. (The image displayed by each display panel may correspond to one portion of a composite image). Thus, a user may not perceive the bezel area BA and the borders between the curved display panels, thereby improving display quality. In one embodiment, the backup images for all of the curved display panels PN1 to PNn may be different images for displaying the composite image.

In one embodiment, when the curved display panels PN1 to PNn are connected, the bezel area BA of one of the curved display panels PN1 to PNn (e.g., the curved display panel PN1) may contact a side of the display area DA1 of an adjacent curved display panel (e.g., curved display panel PN2). The curved display panels PN1 and PN2 may be electrically connected when this contact is present. Thus, one image may be displayed through all the curved display panels PN1 to PNn.

In one embodiment, when the curved display panels PN1 to PNn are (physically) separated, the curved display panels PN1 to PNn may shift in a horizontal direction (e.g., the first direction 10 and/or the second direction 20) to form a vertical blind. For example, as illustrated in FIG. 2C, the curved display panels PN1, PN2, and PN3 may shift in the first direction 10. A third curved display panel PN3 may not shift and only first and second curved display panels PN1 and PN2 may shift.

In one embodiment, shift ranges of the first to third curved display panels PN1, PN2, and PN3 may be different each other. For example, the shift range of the first curved display panel PN1 may be the longest and the shift range of the third curved display panel PN3 may be the shortest. Thus, a space occupied by the curved display panels PN1 to PNn and the blind display device 1000 having the same may be reduced. When the blind display device 1000 is applied to a portable device, portability of the blind display device 1000 may be improved.

In one embodiment, a contact unit for contacting a contact unit of an adjacent curved display panel may be embedded in the first display area DA1. An image display operation of all of the curved display panels PN1 to PNn may be relationally controlled by a communication between the contact units.

The curved display area DA2 may be located at a border between adjacent curved display panels. The curved display area DA2 may display a backup image to display an image of a border between adjacent curved display panels when the curved display panels are connected to each other. The backup image may allow a smooth image to be formed between the adjacent curved display panels. Thus, a user may not perceive the border and the bezel area BA, but instead may perceive a seamless image on the blind display device 1000. The curved display area may be between the flat display area DA1 and the bezel area BA.

The bezel area BA may include a driver integrated circuit (IC) and the contact unit. The driver IC controls the display of an image at the flat display area DA1 and the curved display area DA2. The contact unit is electrically connected to the adjacent curved display panel. The bezel area BA may be located at a side of the curved display area DA2. Thus, the bezel area BA may be not visible to the user when the curved display panels PN1 to PNn are connected to each other.

In one embodiment, the bezel area BA may extend to upper regions of the flat display area DA1 and the curved display area DA2 and to lower regions of the flat display area DA1 and the curved display area DA2. The driver IC, the contact units that communicate with the adjacent curved display panel, and a power supply may be disposed in the bezel area BA.

As illustrated in FIGS. 2A and 2B, in one embodiment each the curved display panels PN1, PN2, and PN3 may further include a buffer member 120. The buffer member 120 may be disposed at inner surfaces of the flat display area DA1, the curved display area DA2, and the bezel area BA to attach the rotating member to each of the curved display panels. The inner surface may correspond to a surface opposite to an outer surface displaying the image. The buffer member 120 may support the flat display area DA1, the curved display area DA2, and the bezel area BA and may maintain an intended form of the flat display area DA1, the curved display area DA2, and the bezel area BA.

In one embodiment, the buffer member 120 may include high hardness plastic sheet. The buffer member 120 may attach the rotating member 300 to each of the curved display panels PN1, PN2, and PN3, and the rotating member 300 may penetrate the buffer member 120 and connect to the supporting member 200.

The supporting member 200 may support the curved display panels PN1 to PNn and guide the horizontal shift of the curved display panels PN1 to PNn. The supporting member 200 may be connected with the rotating member 300. In one embodiment, the supporting member 200 may include a slide lane for shifting (or moving) the rotating member 300. Further, the supporting member 200 may be expanded or shrunk in the horizontal direction according to the horizontal shift of the curved display panels PN1 to PNn. Thus, the overall volume of the blind display device 1000 may be changed. The supporting members 200 are above the upper side and under the lower side of the curved display panels PN1 to PNn in FIG. 1. In one example, the supporting member 200 may have a box form that further covers front and back sides of the curved display panels PN1 to PNn in FIG. 1.

The rotating member 300 may couple each of the curved display panels PN1 to PNn to the supporting member 200, and may rotate each of the curved display panel in the horizontal direction 10 and 20. The curved display panels PN1 to PNn may be physically connected to or separated from each other by rotation. The rotating member 300 may be shifted through a lane of the supporting member 200. Thus, the curved display panels PN1 to PNn may be shifted in the horizontal direction 10 and 20. In one embodiment, the rotating member 300 may penetrate the buffer member 120 and connect to the supporting member 200. In one embodiment, the rotating member 300 may include metal lines to transfer power and signals to curved display panels PN1 to PNn.

As illustrated in FIG. 2A, the curved display panels PN1 to PNn may be rotated and physically connected to each other to form an integrated display panel for displaying the single composite image. In this position, the curved display panels PN1 to PNn may be considered to be closed. The curved display area DA2 of the first curved display panel PN1 may be adjacent to one side of the flat display area DA2 of the second curved display panel PN2. The bezel area BA of the first curved display panel PN1 may be concealed by the curved display area DA1 of the first curved display panel PN1.

In one embodiment, the curved display area DA2 of the first curved display panel PN1 may display the backup image in order to visually link an image of the first curved display panel PN1 and an image of the second curved display panel PN2. (The image displayed by each display panel may correspond to one portion of the composite image). In one embodiment, the backup image may be a border image between the first curved display panel PN1 and the second curved display panel PN2. Thus, a user may not perceive the bezel area BA and the borders between the curved display panels PN1, PN2, and PN3, thereby improving display quality.

As illustrated in FIG. 2B, the curved display panels PN1, PN2, and PN3 may be physically separated through rotation. In this position, the curved display panels PN1, PN2, and PN3 may be considered to be open. In the open position, the curved display panels PN1, PN2, and PN3 may be aligned substantially parallel to each other. In one embodiment, rotating angles of the curved display panels PN1, PN2, and PN3 may be from about 0° to about 90° or another range.

As illustrated in FIG. 2C, in the open position, the curved display panels PN1, PN2, and PN3 may shift in the horizontal direction 10 and 20. In one embodiment, the curved display panels PN1, PN2, and PN3 may shift in the first direction 10 or the second direction 20 through the lane of the supporting member 200. The space occupied by the blind display device 1000 may be reduced or minimized by the horizontal shift.

As described above, the curved display areas DA2 display backup images at the borders of the adjacent curved display panels PN1 to PNn. The backup images may allow a seamless composite image to be perceived by a user. In addition, the size of the supporting member 200 may be expanded or reduced in the horizontal direction 10 and 20 according to the horizontal shift of the curved display panels PN1 to PNn. As a result, the overall size and/or volume of the blind display device 1000 may be adjusted. Thus, portability of the blind display device 1000 may be enhanced.

Figure 3:
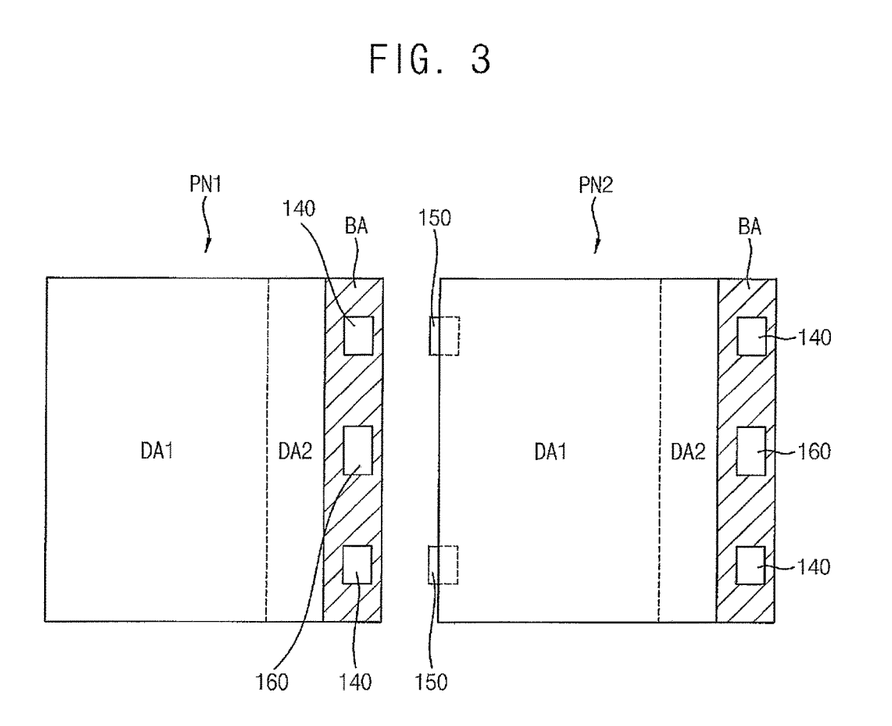
FIG. 3 illustrates an example of how curved display panels may be connected.

FIG. 3 illustrates an example of how the curved display panels in the blind display device 1000 of FIG. 1 are connected to each other. Referring to FIG. 3, each of the first and second curved display panels PN1 and PN2 may include a flat display area DA1, a curved display area DA2, and a bezel area BA. The first and second curved display panels PN1 and PN2 may include buffer members 120 at inner surfaces of the flat display area DA1, the curved display area DA2, and the bezel area BA. The first and second curved display panels PN1 and PN2 may be adjacent to each other.

A driver IC 160 (or driver ICs) and a first contact unit 140 (or first contact units 140) may be included in the bezel area BA of the first curved display panel PN1. If another curved display panel is located at the left side of the first curved display panel PN1, the first curved display panel PN1 may further include a second contact unit 150 in the flat display area DA1. If another curved display panel in not located at right side of the second curved display panel PN2, the first contact unit 140 of the second curved display panel PN2 may be omitted.

The driver IC 160 may control the display of an image in the flat display area DA1 and the curved display area DA2. In one embodiment, the driver IC 160 includes a controller and a display panel driver. The driver IC 160 generates an image control signal to control synchronization of images displayed at the curved display panels PN1 and PN2. The display panel driver provides a data signal and a gate signal to the flat display area DA1 and the curved display area DA2. The controller may generate a control signal to control the display panel driver and may provide the control signal to the display driver. The image control signal may be applied to the first contact unit 140 and/or the second contact unit 150.

The first contact unit 140 may be in contact with the second curved display panel PN2, to electrically connect the first curved display panel PN1 to the second curved display panel PN2. In one embodiment, when the first and second curved display panels PN1 and PN2 are physically connected, the first contact unit 140 of the first curved display panel PN1 may be contact with or electrically connected to the second contact unit 150 in the flat display area DA1 of the second curved display panel PN2. Thus, signal transmission between the curved display panels may be performed through the first and second contact units 140 and 150.

In one embodiment, the first contact unit 140 may be in contact with the second contact unit 150 to allow the image control signal to be shared between the first curved display panel PN1 and the second curved display panel PN2. The image control signal may include, for example, luminance information of the image, synchronization information, and/or other information. In one embodiment, the first and second curved display panels PN1 and PN2 may control luminance and grayscale by sharing the image control signal. The first and second curved display panels PN1 and PN2 may control luminance substantially equivalently by sharing the image control signal. In another embodiment, three or more curved display panels may share the image control signal through the contact units.

Similar to the first curved display panel PN1, the driver IC 160 and the first contact unit 140 may be in the bezel area BA of the second curved display panel PN2. The second contact unit 150 may be in the flat display area DA1 of the second curved display panel PN2 to contact the first contact unit 140 of the first curved display panel PN1. When the first and second curved display panels PN1 and PN2 are physically connected, the first contact unit 140 of the first curved display panel PN1 may be in contact with or electrically connected to the second contact unit 150 in the flat display area DA1 of the second curved display panel PN2.

In one embodiment, the first contact unit 140 and the second contact unit 140 may include Radio Frequency Identification (RFID) communication circuits. In this case, the first contact unit 140 and the second contact unit 140 may perform communication between the first curved display panel PN1 and the second curved display panel PN2 by any one of a variety of RFID communication methods. For example, each of the first contact unit 140 and the second contact unit 140 may include an antenna, a semiconductor chip, etc., for performing RFID communication. When the first and second curved display panels PN1 and PN2 are physically connected, signal exchange and transfer between the first and second curved display panels PN1 and PN2 may be performed relatively accurately, even though the first contact unit 140 of the first curved display panel PN1 and the second contact unit 150 of the second curved display panel PN2 are not in contact.

In one embodiment, the first contact unit 140 and the second contact unit 150 may include optical communication elements. Accordingly, the first contact unit 140 and the second contact unit 150 may perform communication between the first curved display panel PN1 and the second curved display panel PN2 by an optical communication method.

Figure 4:
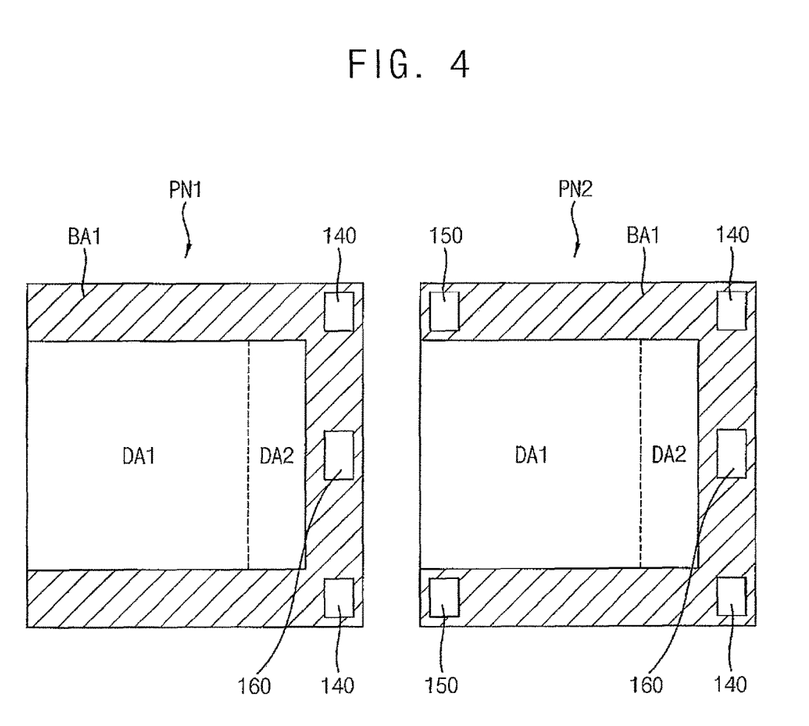
FIG. 4 illustrates another example of how curved panels may be connected.

FIG. 4 illustrates another example of how the curved display panels in the blind display device 1000 of FIG. 1 are connected to each other. Referring to FIG. 4, each of the first and second curved display panels PN1 and PN2 may include a flat display area DA1, a curved display area DA2, and a bezel area BA. Each of the first and second curved display panels PN1 and PN2 may include a buffer member 120 at inner surfaces of the flat display area DA1, the curved display area DA2, and the bezel area BA1. The first and second curved display panels PN1 and PN2 may be adjacent to each other.

In one embodiment, the bezel area BA1 may be extended to upper regions of the flat display area DA1 and the curved display area DA2 and to lower regions of the flat display area DA1 and the curved display area DA2.

A driver IC 160 (or driver ICs) and a first contact unit 140 (or first contact units 140) may be in the bezel area BA1 of the first curved display panel PN1. The driver IC 160 may control display of an image at the flat display area DA1 and the curved display area DA2. In one embodiment, the driver IC 160 may include a controller and a display panel driver. The controller generates an image control signal for controlling synchronization of images displayed at the curved display panels PN1 and PN2. The display panel driver provides a data signal and a gate signal to the flat display area DA1 and the curved display area DA2. In one embodiment, the driver IC 160 may be located in at least one of an upper region of the bezel area BA1 (which extends to the upper region of the flat display area DA1) or a lower region of the bezel BA1 area (which extends to the lower region of the flat display area DA1).

The first contact unit 140 may be in contact with the second curved display panel PN2 to electrically connect the first curved display panel PN1 to the second curved display panel PN2. In one embodiment, when the first and second curved display panels PN1 and PN2 are physically connected, the first contact unit 140 of the first curved display panel PN1 may be in contact with or electrically connected to the second contact unit 150 located in at least one of an upper region of the bezel area BA1 (which extends to the upper regions of the flat display area DA1 and the curved display area DA2) or a lower region of the bezel area (which extends to the lower regions of the flat display area DA1 and the curved display area DA2). Thus, signal transmission between the curved display panels may be performed through the first contact unit 140 of the first curved display panel Pn1 and the second contact unit 150 of second curved display panel PN2.

Similar to the first curved display panel PN1, the driver IC 160 and the first contact unit 140 may be in the bezel area BA1 of the second curved display panel PN2. The second contact unit 150 may be in at least one of an upper region of the bezel area BA1 (which extends to the upper regions of the flat display area DA1 and the curved display area DA2) or a lower region of the bezel area (which extends to the lower regions of the flat display area DA1 and the curved display area DA2). When the first and second curved display panels PN1 and PN2 are physically connected, the first contact unit 140 of the first curved display panel PN1 may be in contact with or electrically connected to the second contact unit 150 in the flat display area DA1 of the second curved display panel PN2.

Figure 5:
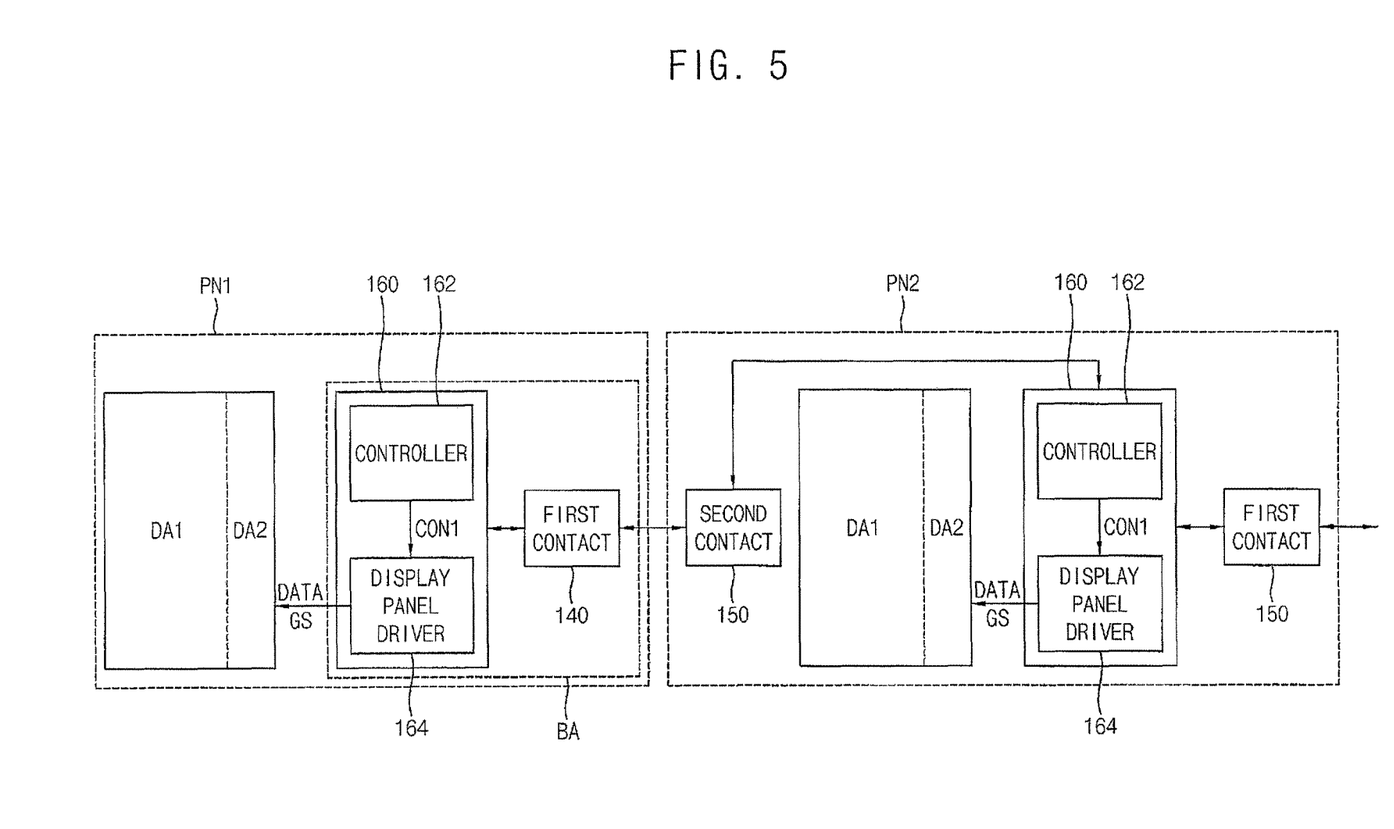
FIG. 5 illustrates an embodiment of a curved display panel.

FIG. 5 illustrates an embodiment of a curved display panel, which, for example, may be representative of the curved display panels in the blind display device 1000 of FIG. 1. Referring to FIG. 5, each of the first and second curved display panels PN1 and PN2 may include the driver IC 160 for displaying an image at the flat display area DA1 and the curved display area DA2, and contact units 140 and 150 for transmitting signals between the adjacent curved display panels. The blind display device 1000 may include a plurality of curved display panels, with adjacent ones having the same or similar relationship between the first and second curved display panels PN1 and PN2 as previously described.

In one embodiment, the bezel area BA may include a driver IC 160 and a first contact unit 140. The bezel area BA may further include a second contact unit 150.

The first contact unit 140 may be in contact with the second contact unit 150 of adjacent curved display panel. For example, the first contact unit 140 of the first curved display panel PN1 may be in contact with the second contact unit 150 of the second curved display panel PN2. In one embodiment, the first and second contact units 140 and 150 may include a RFID communication circuit or an optical communication element (e.g., fiber optics, optical transmitter, optical receiver, modulator, amplifier, etc.) to allow the first and second contact units 140 and 150 to establish communication between the first curved display panel PN1 and the second curved display panel PN2.

In one embodiment, the second contact unit 150 may be in the flat display area of the curved display panel. For example, the second contact unit 150 may be in contact with the first contact unit 140 of the adjacent curved display panel when the curved display panels are physically connected. In one embodiment, the second contact unit 150 may be located in at least one of an upper region of the bezel area BA (which extends to the upper regions of the flat display area DA1 and the curved display area DA2) or a lower region of the bezel area BA (which extends to the lower regions of the flat display area DA1 and the curved display area DA2) when the bezel area extends to the upper regions of the flat display area DA1 and the curved display area DA2 and to the lower regions of the flat display area DA1 and the curved display area DA2.

The driver IC 160 may be in the bezel area BA. The driver IC 160 may control display of an image in the flat display area DA1 and the curved display area DA2. In one embodiment, driver IC 160 may include a controller 162 and a display panel driver 164.

The controller 162 may generate an image control signal CON1 to control synchronization of images displayed at the curved display panels PN1 and PN2. The controller 162 may provide the image control signal CON1 to the display panel driver 164 and/or the contact unit (e.g., the first and second contact units 140 and 150). The controller 162 may receive a control signal for controlling display of respective portions of the whole (e.g., composite) image from the first contact unit 140 and/or the second contact unit 150.

In one embodiment, the controller may control the display panel driver 164. For example, the controller 162 may receive a red, green, and blue (RGB) image signal, a vertical synchronization signal, a horizontal synchronization signal, a main clock signal, and a data enable signal from an external graphic controller, and may generate the image control signal CON1 including an output image signal corresponding to the RGB image signal, etc.

The controller 162 may control a gate driver and a data driver in the display panel driver 164. For example, the image control signal CON1 may include a vertical synchronization start signal, which controls the start of outputting agate signal GS, a scan clock signal, which controls the output timing of the gate signal, and an output enable signal, which controls the duration of the gate signal. The image control signal CON1 may include a horizontal synchronization start signal, which controls the start of outputting a data signal DATA, a data clock signal, which controls the output timing of the data signal DATA, and a load signal.

The image control signal CON1 may be provided to the first contact unit 140 and/or the second contact unit 150 and applied to the other curved display panels via the first and second contact units and 150. Thus, the whole curved display panels may share the image control signal CON1. The curved display panels PN1 and PN2 may control luminance and grayscale by sharing the image control signal CON1. The curved display panels PN1 and PN2 may control luminance in a substantially equivalent manner by sharing the image control signal CON1. The image control signal CON1 may display the backup display at the curved display area DA2. The backup display may be displayed at the border between the first and second curved display panels PN1 and PN2, to thereby establish display of a smooth, seamless composite image.

The display panel driver 164 may provide the data signal DATA and the gate signal GS to the flat display area DA1 and the curved display area DA2. The display panel driver may include a gate driver and a data driver. In one embodiment, the display panel driver 164 may further include a power driver to apply a power to the display areas DA1 and DA2.

The gate driver may provide the gate signal GS to the flat display area DA1 and the curved display area DA2, via a plurality of gate lines, based on the image control signal CON1 from the controller 162. The data driver may provide the data signal DATA to the flat display area DA1 and the curved display area DA2, via a plurality of data lines, based on the image control signal CON1 from the controller 162.

Accordingly, the curved display panels PN1 and PN2 may display a connected image based on the image control signal CON1 receiving from the first and/or second contact units 140 and 150.

Figure 6:
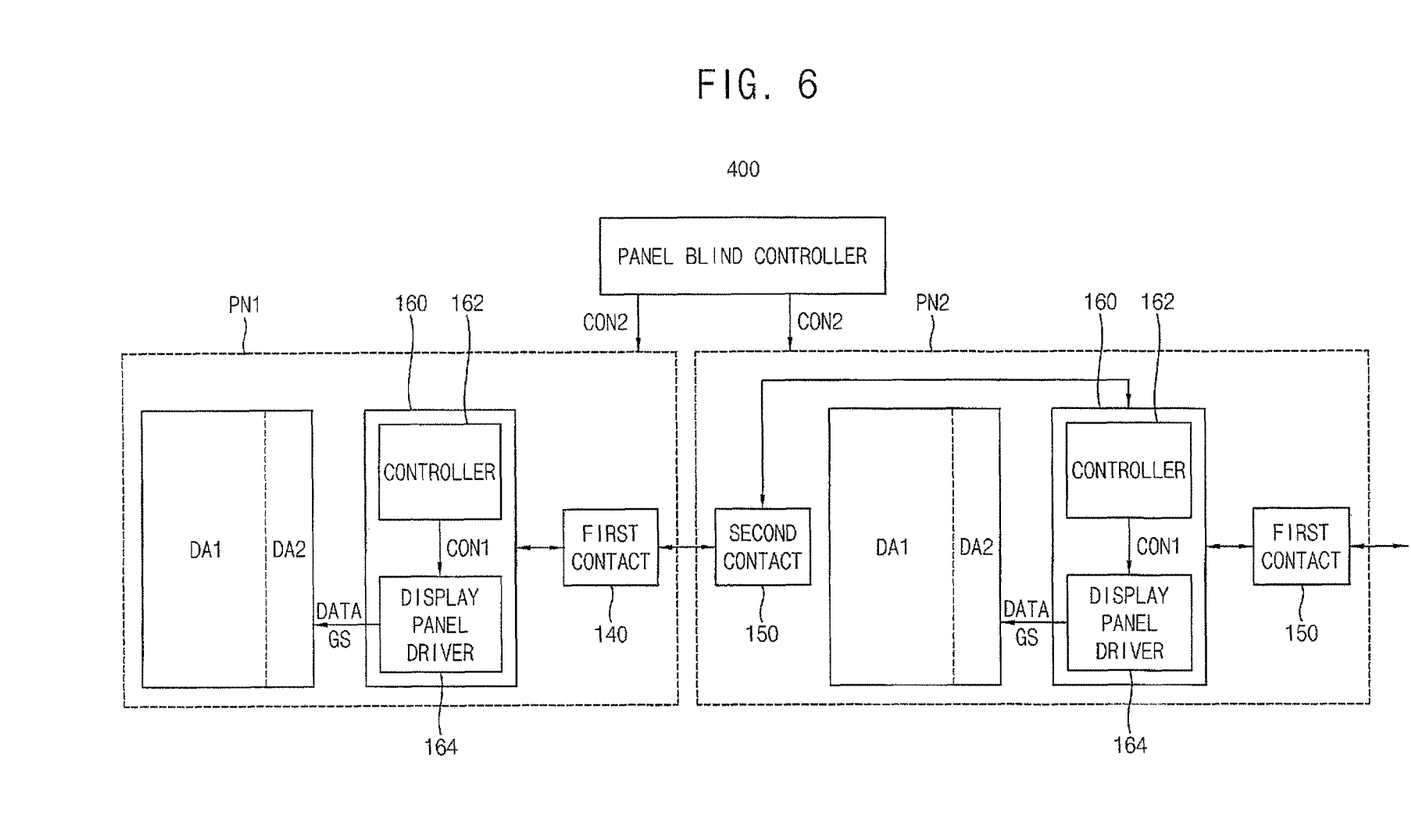
FIG. 6 illustrates another embodiment of a curved display panel.

FIG. 6 illustrates another example of a curved display panel, which, for example, may represent the curved display panels in the blind display device 1000 of FIG. 1. Referring to FIG. 6, the blind display device 1000 may include the plurality of curved display panels PN1 and PN2, the supporting member 200, the rotating member 300, and a panel blind controller 400.

The first and second curved display panels PN1 and PN2 may include a driver IC 160 and contact units 140 and 150. The driver IC 160 may display an image at the flat display area DA1 and the curved display area DA2. The contact units 140 and 150 may transmit a signal between the adjacent curved display panels PN1 and PN2.

The panel blind controller 400 may control rotation of the rotating member (e.g., 300 of FIG. 1) to electrically and mechanically connect the curved display panels. The curved display panels PN1 and PN2 may have an integrated display panel form or a completely separated form. In one embodiment, the panel blind controller 400 may provide a control signal CON2 for controlling rotation of the rotating members to the curved display panels PN1 and PN2 or the rotating members connected to the curved display panels PN1 and PN2.

In one embodiment, the panel blind controller 400 may control the horizontal shift of the curved display panels PN1 and PN2 when the curved display panels are aligned in a substantially parallel manner relative to each other by rotating, as illustrated, for example, in FIG. 2B. As illustrated in FIG. 2C, the curved display panels PN1, PN2, and PN3 may shift, for example, in the right direction 10. The third curved display panel PN3 may not shift and only the first and second curved display panels PN1 and PN2 may shift. In one embodiment, the shift ranges of the first to third curved display panels PN1, PN2, and PN3 may be the same or different from each other. For example, the shift range of the first curved display panel PN1 may be the longest and the shift range of the third curved display panel PN3 may be the shortest.

In one embodiment, the panel blind controller 400 may control expansion or reduction of the supporting member 200 in the horizontal direction based on the horizontal shift of the curved display panels PN1 and PN2. In one embodiment, the rotation and shift of the curved display panels may be performed by physical control without the panel blind controller.

Figure 7:
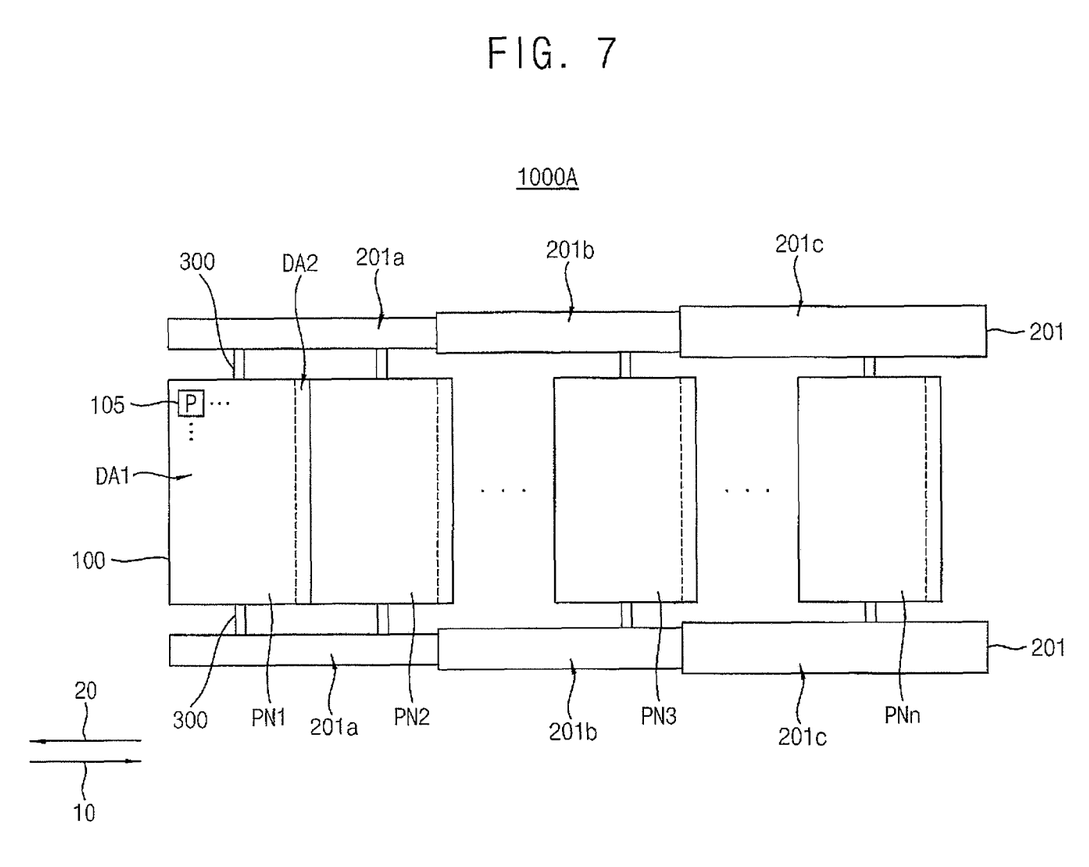
FIG. 7 illustrates an embodiment of a supporting member.
Figure 8:
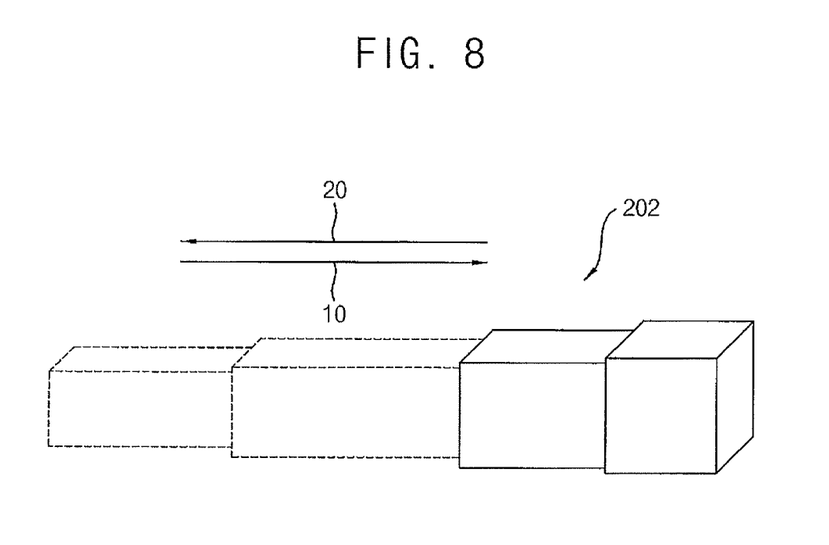
FIG. 8 illustrates another embodiment of a supporting member.

FIG. 7 illustrates another embodiment of a blind display device 1000A which includes an embodiment of a supporting member, and FIG. 8 illustrates another embodiment of a supporting member which, for example, may be used in the blind display device 1000A. The blind display device 1000A of FIG. 7 may be substantially the same as the blind display device 1000 of FIG. 1 except for the supporting member.

Referring to FIGS. 7 and 8, the blind display device 1000A includes a plurality of curved display panels PN1 to PNn, a supporting member 201, and a rotating member 300. The curved display panels PN1 to PNn may be arranged in a first direction 10. Each of the curved display panels PN1 to PNn may include a flat display area DA1, a bezel area BA, and a curved display area DA2 between the flat display area DA1 and the bezel area BA. The first direction 10 may correspond to a horizontal direction and a second direction 20 may correspond to a direction opposite to the first direction 10.

The supporting member 201 may guide horizontal shift of the curved display panels PN1 to PNn. The supporting member 201 may be connected to the rotating members 300. The supporting member 201 may be expanded or reduced in length in the horizontal directions 10 and 20 according to the horizontal shift of the curved display panels PN1 to PNn.

For example, as illustrated in FIGS. 7 and 8, the supporting member 201 may be reduced in length in the first direction 10 or expanded in length in the second direction 20. In one embodiment, the supporting member 201 may include a plurality of sub-supporting members 201a, 201b, and 201c successively connected in the first direction 10. For example, a diameter (or cross-section) of the first sub-supporting member 201a may be less than that of the second sub-supporting member 201b. The diameter (or cross-section) of the second sub-supporting member 201b may be less than that of the third sub-supporting member 201c. Thus, one sub-supporting member having a relatively small diameter may shift into and out from another sub-supporting member having a relatively large diameter, in order to allow the supporting member 201 to be expand or reduce in length. The shape and/or structure of the supporting member 201 for adjusting the overall length or volume of the blind display device 1000 may be different in another embodiment. For example, in accordance with one embodiment the sub-supporting member may have a cylindrical shape.

As illustrated in FIG. 8, a supporting member 202 may have a box form further covering front and back sides of the curved display panels. The supporting member 202 may cover the curved display panels. Thus, the supporting member 202 may be expanded or reduced in length in the horizontal direction according to the horizontal shift of the curved display panels. Thus, the overall length or volume of the blind display device 1000 may be adjustable. As a result, portability of the blind display device 1000A may be enhanced.

Each rotating member 300 may couple one of the curved display panels PN1 to PNn and the supporting member 201, and may rotate this curved display panel in the horizontal direction. The curved display panels PN1 to PNn may be physically connected to or separated from each other by rotation. The rotating member 300 may be shifted through a lane of the supporting member 200.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers and other processing features of the embodiments described herein may be implemented in logic which, for example, may include hardware, software, or both. When implemented at least partially in hardware, the controllers and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

By way of summation and review, vertical blind and other types of multiple-display devices have been developed with bezel areas or borders that link display panels. The bezel areas appear as black lines in the composite image and thus serve to diminish display quality. In addition, the display panels may be controlled independently from one another. As a result, a luminance difference and/or color difference may exist between the display panels, thereby further diminishing display quality.

In accordance with one or more of the aforementioned embodiments, a blind display device may include curved display areas that display backup or sub images at borders of adjacent curved display panels. As a result, the blind display device may provide a seamless composite image. In addition, the supporting member 200 may be expanded or reduced to adjust the overall size or volume of the blind display device. Thus, portability of the blind display device may be enhanced.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present embodiments as set forth in the following claims.

What is claimed is:

1. A blind display device, comprising:
    a plurality of curved display panels arranged in a first direction, each of the curved display panels including a curved display area between a flat display area and a bezel area;
    a support to guide movement of the curved display panels; and
    a plurality of rotators to couple corresponding ones of the curved display panels to the support and to rotate corresponding ones of the curved display panels, wherein the curved display area of a first curved display panel of the curved display panels is to contact one side of the flat display area of a second curved display panel of the curved display panels when the curved display panels are physically connected to each other, and wherein the second curved display panel is adjacent to the first curved display panel.

2. The blind display device as claimed in claim 1, wherein the bezel area in the first curved display panel includes:
    a driver integrated circuit (IC) to control display of an image at the flat display area and the curved display area of the first curved display panel; and
    a first contact to be electrically connected to the second curved display panel adjacent to the first curved display panel.

3. The blind display device as claimed in claim 2, wherein the flat display area in the second curved display panel includes:
    a second contact in the flat display area, the second contact to be electrically connected to the first contact of the first curved display panel.

4. The blind display device as claimed in claim 3, wherein the bezel area of the first curved display panel contacts a side of the flat display area of the second curved display panel, when the first curved display panel and the second curved display panel are to be physically connected.

5. The blind display device as claimed in claim 3, wherein the first contact contacts the second contact to allow an image control signal to be shared between the first curved display panel and the second curved display panel.

6. The blind display device as claimed in claim 5, wherein the curved display panels control luminance substantially equivalently based on the shared image control signal.

7. The blind display device as claimed in claim 3, wherein:
    the first contact and the second contact include Radio Frequency Identification (RFID) communication circuits, and
    the first curved display panel and the second curved display panel communicate with one another through the RFID communication circuits in the first and second contacts.

8. The blind display device as claimed in claim 3, wherein:
    the first contact and the second contact include optical communication components, and
    the first curved display panel and the second curved display panel communicate with one another through the optical communication components of the first and second contacts.

9. The blind display device as claimed in claim 2, wherein the bezel area extends to upper regions of the flat display area and the curved display area and to lower regions of the flat display area and the curved display area.

10. The blind display device as claimed in claim 9, wherein the bezel area in the second curved display panel includes:
    a second contact in at least one of an upper region of the bezel area, which extends to the upper regions of the flat display area and the curved display area, or a lower region of the bezel area which is to extend to the lower regions of the flat display area and the curved display area, and
    wherein the second contact is to be electrically connected to the first contact of the first curved display panel when the first curved display panel and the second curved display panel are to be physically connected.

11. The blind display device as claimed in claim 1, wherein the support is to expand or reduce in size according to movement of the curved display panels.

12. The blind display device as claimed in claim 2, wherein the driver IC includes:
    a controller to generate an image control signal for synchronization of images displayed through the curved display panels; and
    a display panel driver to provide a data signal and a gate signal to the flat display area and the curved display area.

13. The blind display device as claimed in claim 1, wherein the curved display area is to display a backup image or a sub image at a border between adjacent ones of the curved display panels when the curved display panels are physically connected to each other.

14. The blind display device as claimed in claim 1, wherein each of the curved display panels includes:
    a buffer at inner surfaces of the flat display area, the curved display area, and the bezel area of each of the curved display panels, wherein the buffer attaches a corresponding one of the rotators to a respective one of the curved display panels.

15. The blind display device as claimed in claim 14, wherein the rotator penetrates the buffer and is connected to the support.

16. The blind display device as claimed in claim 1, further comprising:
    a panel blind controller to control rotation of the rotators in order to electrically and mechanically connect the curved display panels to form an integrated display panel.

17. The blind display device as claimed in claim 16, wherein the panel blind controller is to control movement of the curved display panels when the curved display panels are aligned in a substantially parallel manner through rotation.

18. The blind display device as claimed in claim 16, wherein the support is to expand or reduce in size according to movement of the curved display panels.

19. A blind display device, comprising:
- a plurality of curved display panels arranged in a first direction, each of the curved display panels including a curved display area between a flat display area and a bezel area;
- a support to guide movement of the curved display panels, the support to expand or reduce in size according to movement of the curved display panels; and
- a plurality of rotators to couple respective ones of the curved display panels and the support and to rotate respective ones of the curved display panels, wherein the curved display area of a first curved display panel of the curved display panels is to contact one side of the flat display area of a second curved display panel of the curved display panels when the curved display panels are physically connected to each other, and wherein the second curved display panel is adjacent to the first curved display panel.

20. The blind display device as claimed in claim 19, wherein each of the curved display panels includes: a contact to contact an adjacent curved display panel contacts, wherein the contact is to transfer an image control signal to the adjacent curved display panel.

* * * * *